July 11, 1967  H. KASTAN  3,330,362
HELICOPTER ROTOR
Filed May 31, 1966  2 Sheets-Sheet 2
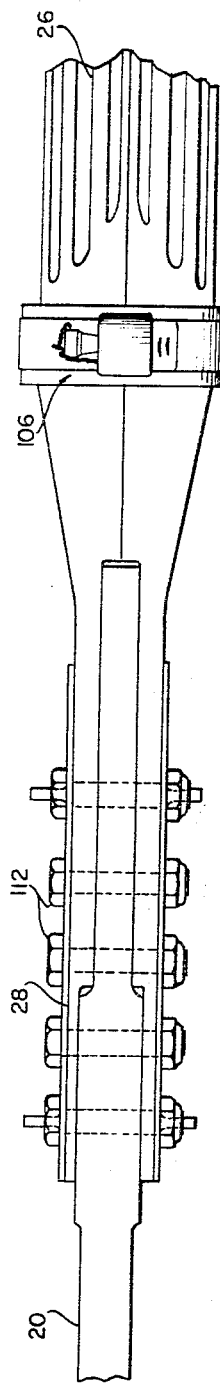
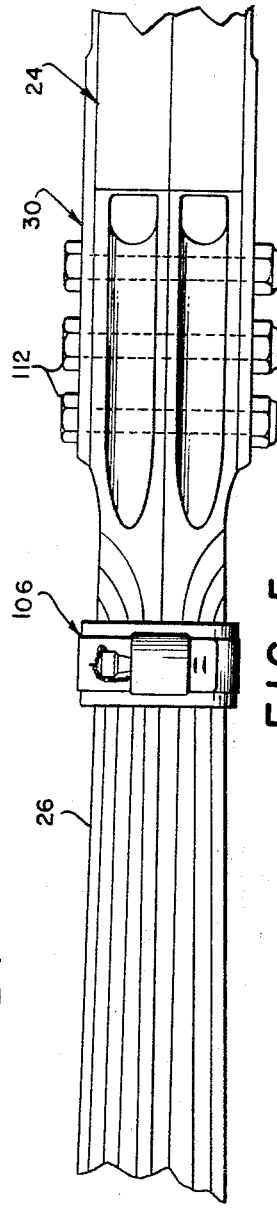
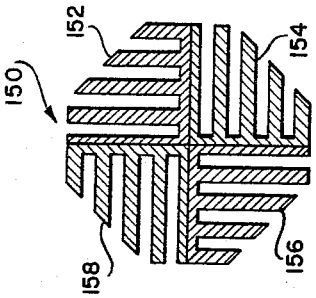
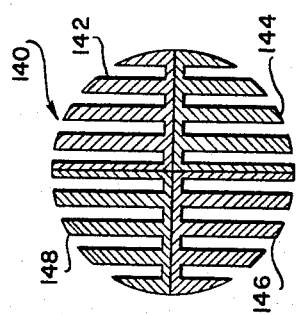
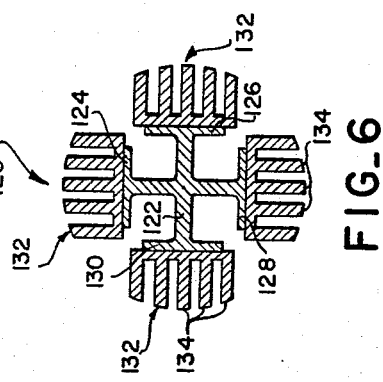
INVENTOR.
HOWARD KASTAN
BY George C. Sullivan
Agent 0# United States Patent Office 3,330,362
Patented July 11, 1967

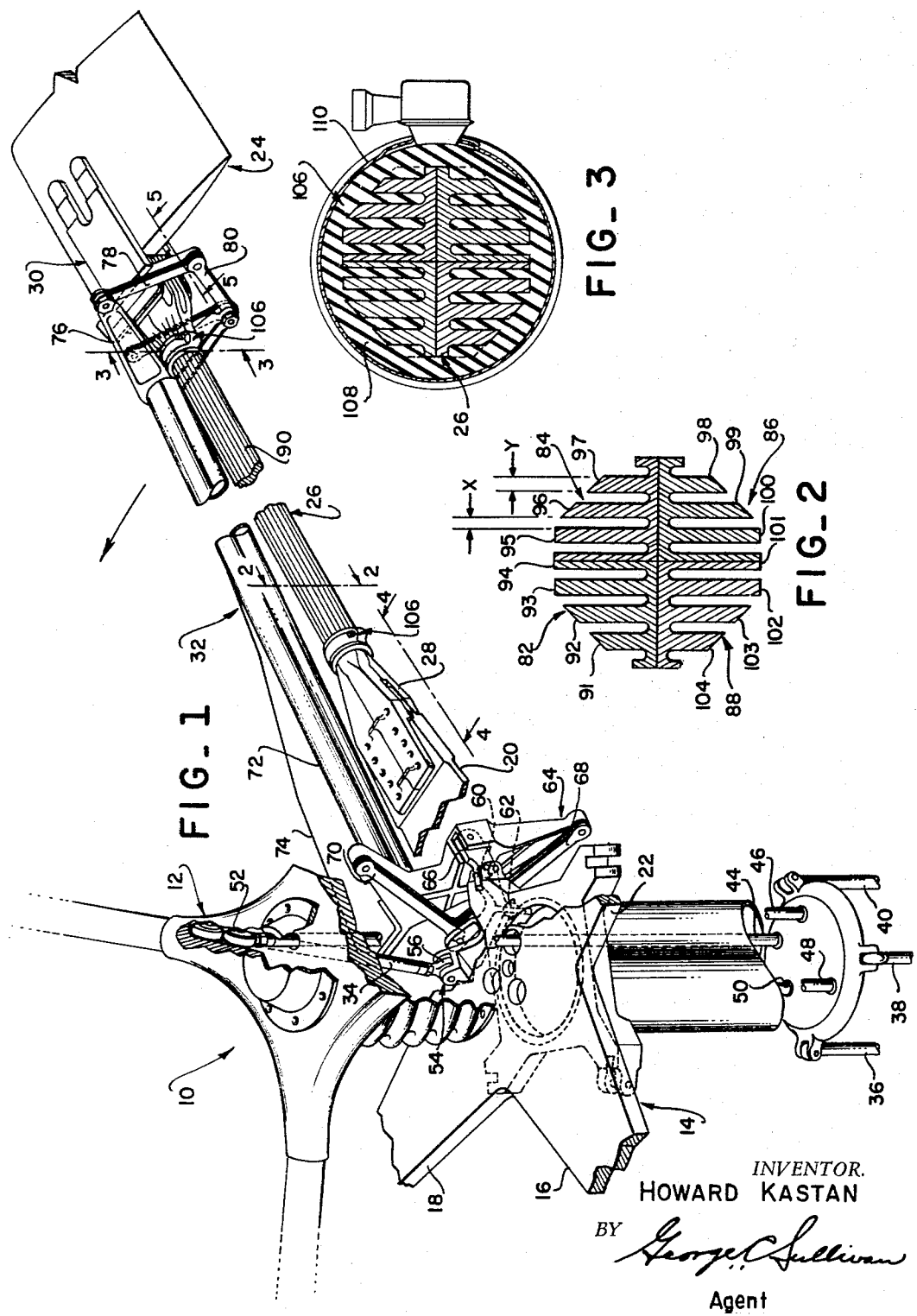

3,330,362
HELICOPTER ROTOR
Howard Kastan, Northridge, Calif., assignor to Lockheed Aircraft Corporation, Burbank, Calif.
Filed May 31, 1966, Ser. No. 553,857
10 Claims. (Cl. 170—160.53)

ABSTRACT OF THE DISCLOSURE

A helicopter rotor beam for supporting a rotor blade with respect to the rotor hub. The beam has a series of longitudinal slots disposed about its periphery making it torsionally soft and substantially equally flexible in the plane of rotor rotation and the plane of flapping which is perpendicular thereto.

---

This invention relates to a rotor for a helicopter aircraft, the rotor providing for movement of a rotor blade through the use of a flexible beam.

In a rotor system using a rigid rotor or semi-rigid rotor principle such as that illustrated in a patent to Cruz et al. 3,135,335, cantilevered non-articulated blades are rigidly attached to a rotor shaft. This general rotor system uses a central gyroscope to control the movement of the blades and a pilot may induce changes in position of the gyroscope which in turn changes the position of the blades to correspond to a desired change in attitude of the helicopter.

It is customary in a rigid rotor or semi-rigid rotor system to produce a flapping action between the rotor shaft and blade system for providing a flexible element in the rotor or the blade or in both. A second movement is provided in the plane of the rotation such that angular velocity changes of the blade in this plane are taken up in the flexibility in the blade system. A third movement of the blade at the pitch axis is normally accomplished by an anti-friction bearing system which permits rotation of the blade as a whole. The first two movements of the blade and rotor system do not cause too much trouble in the design of the system. However, the third movement, i.e., rotation of the blade around its pitch axis, creates some problems, particularly in regard to the variation in friction in the feathering bearings with variations in forces applied to the blades during flight. These variations in friction create non-linear, variable loads which are applied through a pitch link to the gyro. Other problems with these feathering bearings lie in the periodic lubrication and maintenance requirements which are in part due to the high loads absorbed by the bearings and need for seal replacement. The maintenance aspects of these bearings keep the helicopter flying for a limited number of hours and increase the cost of periodic maintenance.

In accordance with the present invention, the disadvantages of the prior art helicopter rotor systems have been eliminated by the incorporation of a rotor system which eliminates anti-friction bearings. Basically, the three types of movements in a rigid rotor or semi-rigid rotor system are directed to a beam which can apply a flapping motion, an in-plane bending motion, and a torsion movement. The present invention is directed to a flexible beam having a flexure which is substantially equal in both the flapping mode and in the in-plane bending mode and is also torsionally soft to accomplish the required movements for such a helicopter system.

More specifically, a beam for a helicopter rotor system, in accordance with the present invention, comprises an elongated central section terminating in flattened end sections. The beam central section has a structurally axi-symmetric cross section providing flexibility in the plane of rotor rotation which is of substantially the same flexibility as in the flapping plane, i.e., at 90° to the plane of rotation.

Another aspect of the present invention, as applied to a helicopter rotor system, is directed to a rotor hub rotatively mounted on a rotor system and having a plane of rotation. The hub has a plurality of arms extending from the hub, the arms being flexible in a plane at right angles to the plane of rotation. A beam has a first one of its ends rigidly secured to the hub and a second end rigidly secured to a rotor blade. The beam has flexibility in both the plane of rotation and in a flapping plane. It is also flexible in torsion. A means for rotating the beam is secured to both the beam and the blade to thereby permit rotation of the blade.

Other features and advantages of the present invention will become more apparent upon review of the appended drawings and the accompanying description:

FIGURE 1 is a perspective view shown partly broken away of a helicopter rotor system constructed in accordance with the present invention;

FIGURE 2 is a cross section, taken along line 2—2 of FIGURE 1, of a flexible beam forming a part of the rotor system illustrated in FIGURE 1;

FIGURE 3 is a cross section, along line 3—3 of FIGURE 1, through the flexible beam illustrated in FIGURE 1;

FIGURE 4 is a partial elevation taken in the direction of line 4—4 of FIGURE 1 and illustrating the connection of the flexure beam and a portion of a rotor arm;

FIGURE 5 is a partial elevation view taken along line 5—5 of FIGURE 1 and illustrating a mounting section of the flexure beam illustrated in FIGURE 1 as connected to a portion of a rotor blade;

FIGURE 6 is a cross section of another embodiment of the present invention as applied to a flexure beam;

FIGURE 7 is a cross sectional view of another embodiment of the present invention as applied to a flexure beam; and FIGURE 8 is a cross sectional view of another embodiment of a flexure beam constructed in accordance with the present invention.

Referring now to FIGURES 1–3, there is a helicopter rotor system 10 constructed according to the present invention which is controlled by a gyroscope 12. A rotor hub 14 is rotatably mounted on the rotor system and includes a plurality of arms 16, 18, 20 and 22 extending from the hub and these arms being flexible in a flapping plane which is approximately 90° to a plane of rotation of the rotor system. For purposes of description and illustration, only a single blade 24 is illustrated. However, it is to be noted that three additional duplicate blades are mounted on the rotor system in a conventional manner and that specific details of the gyroscope 12, the rotor 14, and the blades 24 form no part of the invention; further details of these elements and of a control system usable in conjunction with the present invention are shown in detail in the patent to Cruz et al. 3,135,335.

A flexure beam 26 having longitudinal slots disposed therein and having a first mounting end 28 secured to the arm 20 of the hub 14 is secured rigidly by a second mounting and 30 to the blade 24. This beam has flexibility in the plane of rotation of the blade 24, in the flapping plane (a plane 90° to that of the plane of rotation), and in torsion. By rotating the second mounting end 30 of the beam 26, the blade 24 will rotate to feather or change the pitch of the blade. This rotational operation is carried out by a torsion tube assembly 32 which is secured to the second mounting section 30. It is also linked to the gyroscope 12 through a connecting link 34 which provides pitch control. Thus, by movement of the gyroscope 12 through the movement of the link 34, the torsion tube assembly 32 is rotated. This, in turn, rotates the beam 26 and the blade 24. It is also seen that the beam 26 can be flexed in the flapping plane or in the in-plane bending mode without constraint from the torsion tube assembly 32.

Control of the helicopter rotor system 10 is somewhat similar to the control system as illustrated in a patent of Cruz et al. 3,135,335 and will not be reiterated. These pilot controls (not shown) are coupled to push rods 36, 38 and 40 which are pivotally connected to a circular swashplate 42. Thus, by applying cyclic or collective pitch through manipulation of a conventional pilot control (not shown), the swashplate is pivoted or translated into a particular attitude. This changes the position of the push rods 44, 46, 48 and 50. For purposes of description and illustration, the relative movement of the gyroscope 12 and the remainder of the rotor system would only be with relation to the movement of the push rod 44. It is to be understood that the remainder of the push rods operate in a very similar manner and movement of the gyroscope and the remainder of the rotor system is substantially identical. The push rod 44 is pivotally connected to the gyroscope through a spherical bearing 52 which is mounted on the underside of the gyroscope 12. This movement is transferred to the pitch link 34 which is coupled to the torsion tube assembly 32 through a bracket 54 by a conventional spherical bearing 56. The bracket 54 is mounted to a platform 58 extending beneath the hub 14 by a pair of conventional spherical bearings 60 and 62 such that the bracket 54 movement relative to the hub 14 and the platform 58 in the pitch bending mode is shifted relative to the bearings 60, 62 and 56. A yoke member 64 is coupled to the bracket 54 by a spherical bearing 66 such that centrifugal forces of the torque tube assembly 32 are transmitted to the bracket 54, while flapping and in-plane motions of the yoke 64 and torsion tube assembly 32 are isolated from the bracket 54. Any torque applied is transmitted through a pair of flexible straps 68 and 70 that are coupled to each other and form a part of the motion transferring means to the torsion tube assembly 32. A torque tube 72 is strengthened by a stiffening member 74, both portions being secured to the yoke 64. The torque tube extends the entire length of the flexure beam 26 and transmits torque to a second yoke 76 and to a system of flexible straps 78 and 80.

The blade 24 is twisted by the torsion tube assembly 32 when a pilot-operated control (not shown) shifts the push rods 36, 38, and 40, or, in the alternative, when the gyroscope 12 changes position, pushing the links 34 to a new position. The remaining operation of the blades by the gyroscope, or through manipulation by pilot controls, is quite similar to that disclosed by Cruz et al. 3,135,335.

Referring to FIGURES 1 and 2, the flexure beam 26 is formed by joining four quadrant portions (sometimes referred to as quadrants) 82, 84, 86, and 88. These quadrants are all bonded together to form a unitary beam having an elongated section 90 having a cross section as illustrated in FIGURE 2. This cross section takes the form of an octagon comprising a series of comb-like elements 91 through 104. The width Y of each comb-like element and the gap X between each pair of elements are selected to provide a beam of low torsional stiffness and having a stiffness in the flapping mode equal to the stiffness in the in-plane bending mode. This feature of the present invention permits the beam to support flexing of the rotor system. It also permits feathering motion without the need of bearings and other mechanical problems inherent in prior art systems. The ends 28 and 30 are formed integrally with the respective quadrants, or separately fabricated and appropriately affixed to them, as by electron beam welding. As best illustrated in FIGURE 3, upon opposite ends of the central section 90 are a pair of collars 106 (usually made of plastic) which are substantially identical to each other, the collars cast-in-place within an annulus 108 defined between the beam and a conventional strap clamp 110. The collar-forming material also extends between the comb-like elements. This collar construction inhibits any tendency of the quadrant elements 82, 84, 86, and 88 to split apart at the bond lines because of redirection of loads in each quadrant to the flattened ends of the beam.

Referring now to FIGURES 4 and 5, the means for attaching the flexure beam 26 to the arm 20 and the blade 24 are illustrated. The beam is basically attached to the arm and the blade by fitting the respective ends 28 and 30 over their mating portions of the arms and blades and securing them together with a plurality of mechanical fasteners 112 in a conventional manner.

Other embodiments of the present invention, particularly the cross section of the flexure beam, are illustrated in FIGURES 6, 7, and 8.

Referring now to FIGURE 6, a flexure beam 120 is illustrated as having a basic outer configuration similar to that illustrated in FIGURE 1. However, the beam cross section in this embodiment is formed with a cruciform central section 122 terminating in four outwardly extending platforms 124, 126, 128, and 130. An elongated comblike element 132 is mounted on each of the platforms and includes a series of comb-like teeth 134. This embodiment serves to perform the same function as the embodiment illustrated in FIGURES 1 and 2 and enables variations in the torsion and bending strengths and stiffnesses of the beam.

Referring now to FIGURE 7, another embodiment of the present invention is illustrated as a flexure beam 140 and is formed from four quadrants 142, 144, 146, and 148. Each quadrant is bonded together in a manner similar to the embodiment illustrated in FIGURE 2. This embodiment is similar in all respects to that in FIGURE 2 with the exception of the outer shape, which is circular rather than octagonal. This change in outer shape changes the torsional and bending strengths and stiffnesses of the beam.

Referring to FIGURE 8, another embodiment of the present invention in the form of a beam 150 has a cross section formed with four separate quadrants 152, 154, 156, and 158, all bonded together in a manner similar to the embodiment illustrated in FIGURE 2. In this embodiment, the teeth-like elements are positioned at right angles to one another to vary the stiffness and the torsional and bending strength of the beam.

While a particular embodiment of the present invention has been illustrated and described, it is within the skill of the art to change the outer configuration of the beam without departing from the invention with minor variations in the shape and construction of the beam cross section. It is to be understood that the beam may be formed in a solid piece or from two or more bonded elements without departing from the invention. The beam may also be constructed as an extension of a rotor blade and thereby eliminates the need for mounting ends and fasteners. The appended claims are intended to cover all modifications and equivalents within the full spirit and scope of this invention.

I claim:
1. In a helicopter rotor system having a rotor mast and a plurality of rotor blades:
    a beam having first and second end sections and a plural part central section interposed therebetween;
        one of said end sections being adapted to be coupled to said mast and the other said end section being adapted to be coupled to said blade; and
    means defining a plurality of longitudinal slots disposed in each part of said central section making said beam flexible substantially equally in the plane of rotor rotation and in the flapping plane at 90 degrees to the plane of rotor rotation.

2. In a helicopter rotor system as defined in claim 1, said beam including four separate quadrants, said quadrants being bonded together.

3. In a helicopter rotor system as defined in claim 2, a clamp disposed about said beam at each end section thereof to secure said quadrants against separation.

4. In a helicopter rotor system as defined in claim 3, said clamp comprising a plastic collar girdling a portion of the central section of the beam, and a metallic strip circumferentially gripping the plastic collar.

5. In a helicopter rotor system as defined in claim 1, said beam having a uniformly shaped cross section in the form of an octagon.

6. In a helicopter rotor system as defined in claim 1, said beam having a substantially constant cross section and being formed in four separate quadrants with these quadrants being bonded together, and wherein said quadrants are symmetrical in shape.

7. In a helicopter rotor system as defined in claim 1, said beam cross section having a cruciform central portion, an outer end of each of the four elements thereof having a platform extending substantially perpendicular therefrom, and wherein a portion of said means defining said longitudinal slots is secured to each of said platforms.

8. In a helicopter rotor system as defined in claim 1, said beam being formed from four quadrants bonded together, each said quadrants having longitudinal slots extending in a direction which is 90 degrees from the adjacent said quadrant.

9. A helicopter rotor system having a rotor shaft and comprising:
   a rotor hub rotatably mounted on the rotor shaft and having a plane of rotation,
   a plurality of arms extending from the hub and being flexible in a plane at right angles to the plane of rotation,
   a plurality of blades, spaced from said rotor hub,
   a plurality of beams each having a first end rigidly secured to one of said arms and a second end rigidly secured to one of said blades and having a flexibility both in the plane of rotation and in a plane at right angles to the plane of rotation,
   said beams being also flexible in torsion and said beam including means defining a plurality of flexible longitudinal elements extending outwardly along the length thereof, each element including a plurality of longitudinally extending slots, and
   means secured to each said beam second end adjacent to the respective blade for rotating the respective beams and blades responsive to remote system inputs.

10. In a helicopter rotor system as defined in claim 1, wherein said beam has a cruciform cross section.

References Cited
UNITED STATES PATENTS

| | | | |
|---|---|---|---|
| 3,026,942 | 3/1962 | Cresap | 170—160.25 |
| 3,052,305 | 9/1962 | Jones et al. | 170—160.53 X |
| 3,261,407 | 7/1966 | Culver et al. | 170—160.25 |

MARTIN P. SCHWADRON, *Primary Examiner.*

EVERETTE A. POWELL, JR., *Examiner.*